United States Patent [19]
Dean

[11] Patent Number: 4,845,155
[45] Date of Patent: * Jul. 4, 1989

[54] ELASTOMER GRAFTED WITH POLYMER MATRIX AND METHOD

[75] Inventor: Barry D. Dean, Broomall, Pa.

[73] Assignee: Arco Chemical Technology, Inc., Wilmington, Del.

[*] Notice: The portion of the term of this patent subsequent to Jan. 1, 2002 has been disclaimed.

[21] Appl. No.: 45,750

[22] Filed: Apr. 30, 1987

Related U.S. Application Data

[60] Division of Ser. No. 808,809, Dec. 13, 1985, abandoned, which is a continuation of Ser. No. 593,143, Mar. 26, 1984, abandoned.

[51] Int. Cl.$^4$ ............................ C08F 4/10; C08F 4/34
[52] U.S. Cl. .................................. 525/245; 525/244; 525/263; 525/282; 525/285; 525/292; 525/301; 525/315

[58] Field of Search ............... 525/245, 247, 263, 244, 525/315, 282, 285, 292, 301

[56] References Cited

U.S. PATENT DOCUMENTS 3,008,920  11/1961  Urchick ............................ 525/245
3,489,822  1/1970   Witt ................................. 524/91
4,491,647  1/1985   Dean ................................ 525/67

FOREIGN PATENT DOCUMENTS 878443  9/1961  United Kingdom ................ 525/68

*Primary Examiner*—Jacob Ziegler
*Attorney, Agent, or Firm*—Dennis M. Kozak

[57] ABSTRACT

A composition of matter which comprises an elastomer grafted at a level of from about 40 to about 60 weight percent with a polymer matrix comprising recurring units of at least one free radical polymerizable monomer and its method of preparation are disclosed.

1 Claim, No Drawings

ELASTOMER GRAFTED WITH POLYMER MATRIX AND METHOD

This is a division of application Ser. No. 06/808,809, filed Dec. 13, 1985, which is a continuation of Ser. No. 06/593,143, filed Mar. 26, 1984, now both abandoned.

Reference is hereby made to copending related application Ser. No. 557,975, filed Dec. 5, 1983, now U.S. Pat. No. 4,491,647, and Ser. No. 06/589,368 filed March 14, 1984, now U.S. Pat. No. 4,593,074 entitled "Elastomer Having Random Peroxide Functionality and Method".

This invention relates to elastomers.

More specifically, this invention relates to elastomers highly grafted with a polymer matrix.

In one of its more specific aspects, this invention pertains to an olefin/α-olefin/non-conjugated diene (EPDM) terpolymer highly grafted with a polymer containing recurring units of at least one alkenyl monomer.

The prior art teaches a variety of techniques permitting peroxide functionalization of olefin/α-olefin co- and terpolymers. U.S. Pat. Nos. 3,458,598; 3,652,724; 3,739,042; and 3,949,018 teach peroxide functionalization of only the polymer chain end. Particularly, U.S. Pat. No. 3,949,018 teaches the end group peroxidation of a living olefin/-olefin polymer chain. The mediating species is a transition metal coordinated to the growing end of the olefin/-olefin polymer. According to these teachings a maximum of two peroxide groups per polymer chain is possible, more accurately a maximum of two peroxide groups only at the ends of the polymer chain. U.S. Pat. No. 3,800,007 teaches polymer end group functionalization (peroxidation) through the use of a specially designed peroxide containing chain transfer agent. This approach permits only polymer chain end functionalization. U.S. Pat. Nos. 3,288,739 and 3,489,822 as well as British Patent No. 877,443 teach random peroxidation of olefin/α-olefin copolymers as well as olefin/α-olefin/non-conjugated diene terpolymers with molecular oxygen as the source for the active peroxide oxygen in the form of hydroperoxides.

The present invention provides elastomers highly grafted with polymer matrices. The level of polymer matrix grafting achieved on the elastomer is significantly greater than the level achieved using prior art methods and is within the range of from about 40 to about 60 weight percent. Prior art methods are limited to grafting levels of less than 25 weight percent.

According to this invention there is provided a composition of matter which comprises an elastomer grafted at a level of from about 40 to about 60 weight percent with a polymer matrix comprising recurring units of at least one free radical polymerizable monomer.

Also, according to this invention there is provided a method for preparing an elastomer highly grafted with a polymer matrix which comprises reacting an elastomer having random dialkyl or alkyl aryl peroxide functionality with at least one free radical polymerizable monomer, whereby said elastomer having peroxide functionality serves to initiate polymerization of said at least one free radical polymerizable monomer, the resulting elastomer highly grafted with a polymer matrix being grafted at a level of from about 40 to about 60 weight percent of said polymer matrix.

In the practice of this invention, any elastomer having pendant allylic, benzylic or conjugated unsaturation at levels within the range of from about 1 to about 20 wt % is suitable for use.

Particularly suitable elastomers are olefin/α-olefin/-nonconjugated terpolymers, generally known as EPDM rubbers and butyl rubber. EPDM rubbers are preferred.

More specifically, the EPDM rubbers suitable for use in making the peroxidized EPDM's usable in this invention are based on mono olefins having the structural formula $CH_2=CHR$ in which R may be a hydrogen atom or a saturated alkyl group such as methyl, ethyl, n-propyl, isopropyl and the like. In addition, the EPDM rubbers are based on non-conjugated straight-chain or cyclic diene hydrocarbons which are copolymerizable with the above mono olefins. Examples of suitable non-conjugated straight-chain diene hydrocarbons copolymerizable with mono olefins are 1,4-pentadiene, 1,4-hexadiene, 1,5-hexadiene and the like. Examples of suitable cyclic diene hydrocarbons are bicyclo[2,2,1] hepta-2,5-diene, dicyclopentadiene, tricyclopentadiene and tetracyclopentadiene. EPDM rubbers most preferred are terpolymer structures in which two mono olefins, ethylene and propylene, and one non-conjugated diene hydrocarbon are used. Most preferred for the non-conjugated diene hydrocarbon are 1,4-hexadiene and dicyclopentadiene. The EPDM rubber should comprise 1 to 15% by weight of the non-conjugated diene hydrocarbon and 85 to 99% by weight of the mono olefins. The preferred ratio of the mono olefins, ethylene and propylene, should be 20/80 to 80/20, preferably between 35/65 to 65/35. Ethylene-propylene-ethylidene norbornene is not suitable for use in the practice of this invention.

Methods for making these rubbers are well known and thoroughly described in U.S. Pat. Nos. 3,000,866 and 3,000,867, the teachings of which are incorporated herein by reference thereto.

The peroxidized elastomer used in the practice of this invention is prepared as follows. The elastomer is dissolved in a solvent, preferably at a temperature within the range of from about at 60°–80° C. The resulting rubber solution is then treated with an oxidizing agent in the presence of a catalyst. The oxidizing agent is an alkyl or aryl hydroperoxide but, most preferably is t-butyl hydroperoxide. The catalyst is selected from any metal in Group VIIa, VIII, Ib or IIb with the appropriate choice of counter ion so as to promote solubility of the catalyst in the rubber solution. A small quantity of tetrahydrofuran or ethanol (absolute) may be added to enhance the solubility of the catalyst in the rubber solution. The peroxidation reaction is run for from about 4 to about 20 hours at a temperature preferably within the range of from about 60° to about 80° C.

Suitable solvents for dissolving the elastomer are various aromatic solvents such as benzene, t-butylbenzene, toluene, xylenes, and halogenated benzenes, such as chlorobenzene; however, most preferred are chlorobenzene and t-butylbenzene.

Catalysts based on metals of Group VIIa, VIII, Ib or IIb are suitable but most preferred are either cobalt (Group VIII) or copper (Group Ib). Preferred catalysts are Cobalt (II) acetate, cobalt (II) propionate, cobalt (II) acetyl acetonate, cobalt (II) 2-ethyl hexanoate, cobalt (II) naphthenate, copper (I) acetate, copper (I) chloride, copper (I) acetylacetonate, copper (I) napthenate, or copper (I) ethylacetoacetate. Most preferred are cobalt (II) acetylacetonate, cobalt (II) napthenate, copper (I) acetate, copper (I) chloride and copper (I) acetyl acetonate.

The peroxidized elastomer produced as described above is then used to initiate the polymerization of any free radical polymerizable monomer or mixture of monomers and thus form an elastomer grafted with a polymer matrix of this invention. Suitable free radical polymerizable monomers include: styrene α,-methylstyrene, p-methylstyren p-chlorostyrene, p-bromostyrene, dibromostyrene, p-cyanostryene, methyl methacrylate, methacrylic acid, acrylic acid, methyl acrylate, n-butyl acrylate, acrylonitrile, maleic anhydride, citraconic anhydride, maleimide, N-methylmaleimide, N-ethyl maleimide, N-phenyl maleimide, N-4(-methyl)phenyl maleimide, N-(4-chloro)phenyl maleimide, N-(4-bromo)phenyl maleimide, N-(3-methyl)phenyl maleimide, N-(3-chloro)phenyl maleimide, N-(3-bromo)phenyl maleimide, N-(2-methyl)phenyl maleimide, N-(2-chloro)phenyl maleimide, N-(2-bromo)phenyl maleimide, methacrylonitrile, p-vinyl benzoic acid, and vinyl chloride.

The peroxidized elastomer produced as described above typically exhibits 0.05 to 0.1 weight percent peroxide which results in 40 to 60% of the polymer formed from the polymerization of the monomer or of monomer mixture, being grafted.

The peak molecular weight of the peroxidized elastomer should be between 100,000 to 1,000,000; most preferably between 100,000 to 400,000. And, the peak molecular weight of the grafted polymer matrix should be between 10,000 to 300,000; most preferably between 50,000 to 150,000.

The following examples serve to demonstrate the invention. Evaluation of material properties was performed based on the following ASTM standard tests: flexural modulus (D-790), tensile strength (D-638), elongation (D-638), notched Izod (D-256) and DTUL(deflection temperature under load, ⅛" at 264 psi, (D-648). Gardner falling weight index was established using a 1¼" diameter orifice and an 8 pound ½" diameter weight. Glass transition temperature was determined by differential scanning colorimetry.

EXAMPLE 1

Using substantially the procedure of Example 1 in Ser. No. 06/589,368 of a peroxidized elastomer was prepared as follows.

In a 4-liter resin kettle 400 grams of an ethylene/propylene/dicyclopentadiene rubber containing 8.5 percent by weight of dicyclopentadiene termonomer were dissolved in 2500 grams of a solvent mixture comprised of 75 percent t-butylbenzene and 25% chlorobenzene. The EPDM rubber dissolved readily in two hours by heating the solution to 70° C. The resin kettle was charged with 120 grams of 40% anhydrous t-butylhydroperoxide in toluene[1] solution. Immediately after the addition of the hydroperoxide solution, 6.2 grams of a 50:50 (by weight) mixture of cuprous chloride and cuprous acetate dissolved in 20-30 ml of tetrahydrofuran or 20-30 ml of absolute ethanol. The reaction mixture was maintained at 70° C. for 24 hours. The EPDM rubber solution was precipitated into a threefold excess of methanol using a high speed Waring Blender for agitation. The EPDM rubber was dried in vacuo at 25° C. and then dissolved in toluene and precipitated into methanol a second time. The peroxidized EPDM rubber was dried in vacuo at 25° C. for 48 hours.

Prepared by extraction of a 70% t-butyl-hydroperoxide water solution with toluene according to the procedure according to the procedure described by K. B. Sharpless, et al. *Journal of Organic Chemistry*, 1983, 48 3607.

The level of active oxygen in the EPDM rubber was determined based on iodine liberation in a modification of method III as described by R. D. Mair and Alda J. Graupner; *Analytical Chemistry*, 1964, 36, 194. The active oxygen was determined to be 836 ppm.

EXAMPLE 2

Using the procedure of Example 2 in Ser. No. 06/589,368, a peroxidized elastomer was prepared as follows.

In a 4-liter resin kettle 400 grams of an ethylene/propylene/dicyclopentadiene were dissolved in 2700 grams of chlorobenzene. The EPDM rubber dissolved readily in three and one half hours by heating the solution to 70° C. The resin kettle was charged with 120 grams of a 40% anhydrouis t-butyl hydroperoxide in toluene solution (prepared as in Example 1). Immediately after the addition of the hydroperoxide solution, 20 grams of a 6% cobalt solution as cobaltous naphthenate in mineral spirits and 1.7 grams of cobaltous acetylacetonate dissolved in 22 milliliters of tetrahydrofuran was added. The reaction mixture was maintained at 70°-72° C. for 8 hours. The EPDM rubber solution was precipitated into a threefold excess of methanol using a high speed Waring Blender for agitation. The EPDM rubber was dried in vacuo at 25° C. and then dissolved in toluene and precipitated into methanol a second time. The peroxidized EPDM rubber was dried in vacuo at 25° C. for 48 hours. The level of active oxygen as determined by the method cited in Example 1 was 1172 ppm.

EXAMPLE 3

Approximately 200 grams of the peroxidized elastomer prepared in Example 2 were dissolved in 800 grams of styrene monomer. The styrene/peroxidized EPDM solution was added to a 4-liter baffled reaction kettle. The reaction temperature was raised to 140° C. with agitation provided by two propellers at a speed of 300 rpm. Once the reaction had reached 21% conversion as determined by sample aliquot analysis, 1500 grams of water containing 5% poly(vinyl) alcohol were added. The resulting suspension was heated and stirred (as above) for six hours. The beads formed were washed with 5% hydrochloric acid solution and then water. The beads were dried under vacuum at 90° C. The overall conversion was 99.5% based on monomer and EPDM rubber added.

The level of polystrene grafted (chemically bound) to the EPDM was determined by subjecting 20 grams of beads to Soxhlet extraction with refluxing methyl ethyl ketone for 120 hours. The methyl ethyl ketone solvent was then poured into methanol to coagulate the non-grafted polystyrene. The level of non-grafted polystyrene was 53% (8.48 grams) and had a peak molecular weight of 167,000. The level of grafted polystyrene was 47% (11.52 grams of methyl ethyl ketone insolubles).

The EPDM-g-polystyrene beads were stabilized with 5.47 grams of Ethanox®330 and 5.51 grams of Mark®2112 antioxidant then extruded and injection molded on standard processing equipment. The specimens molded were tested according to the ASTM standards cited (Table I).

TABLE I

| % EPDM Rubber | 20 |

TABLE I-continued

| | |
|---|---|
| Tg (°C.) | |
| grafted PS matrix | 106 |
| non-grafted PS matrix | 106 |
| Tensile strength (psi) | 5,770 |
| Flexural modulus (psi) | 307,000 |
| Elongation (%) | 28.5 |
| Notched Izod (ft-lbs/in) | 7.3 |
| Gardner Falling Weight Index (in-lbs) | 280 |
| DTUL (°F.) | 174 |

EXAMPLE 4

Approximately 200 grams of peroxidizing elastomer, as prepared in Example 2, containing 1012 ppm of active oxygen, were dissolved in 350 grams of chlorobenzene in a 3 pint pressure reactor. Once all the rubber was dissolved 200 grams of methyl methacrylate monomer were added to the reactor and the temperature raised to 132° C. for six hours. The polymer mass was precipiated in a threefold excess of methanol using a Waring Blender. The polymer crumb obtained was dried under vacuum at 100° C. The total of EPDM-g-PMMA recovered was 384 grams (96% conversion). Soxhlet extraction of 12 grams of the EPDM-g-PMMA with methyl ethyl ketone for 118 hours revealed 2.7 grams of non-grafted PMMA (46.9%) with peak molecular weight of 187,000. The level of PMMA grafted to the EPDM rubber was 53.1%. The glass transition temperature of both the grafted and non-grafted PMMA was 101.5° C.

EXAMPLE 5

Approximately 200 grams of the peroxidized elastomer prepared in Example 1 were dissolved in 375 grams of chlorobenzene in a 3 pint pressure reaction vessel. Once all the rubber was dissolved 200 grams of methyl methacrylate monomer were added to the reactor and the temperature raised to 135° C. for 5.5 hours. The polymer was precipitated in a threefold excess of methanol using a Waring Blender. The polymer crumb obtained was dried under vacuum at 100° C. The total of EPDM-g-PMMA recovered was 365 grams (91% conversion). Soxhlet extraction of 15 grams of the EPDM-g-PMA with methyl ethyl ketone for 112 hours revealed 3.71 grams of nongrafted PMMA (55%) with peak molecular weight of 209,000. The level of PMMA grafted to the EPDM rubber was 45%. The glass transition temperature of both the grafted and non-grafted PMMA was 102.5° C.

EXAMPLE 6

Approximately 200 grams of the peroxidized elastomer prepared in Example 1 were dissolved in 375 grams of chlorobenzene in a 3 pint pressure reaction vessel. Once all the rubber had dissolved, 47 grams of N-phenyl maleimide and 153 grams of methyl methacrylate were added and the temperature was raised to 140° C. for 6.5 hours. The polymer mass was precipitated into a fourfold excess of methanol using a Waring Blender. The polymer crumb obtained was dried under vacuum at 110° C. The total of EPDM-g-MMA/NPMI recovered was 397 grams (99.2% conversion). Soxhlet extraction of 25 grams of the EPDM-g-MMA/NPMI with methyl ethyl ketone for 122 hours revealed 5.8 grams (47%) of non-grafted MMA/NPMI with peak molecular weight of 188,000. The level of MMA/NPMI grafted to the EPDM rubber was 53%. The glass transition temperature of both the grafted and non-grafted MMA/NPMI was 142.5° C. The MMA/NPMI copolymer grafted to the EPDM rubber contained 23.5% by weight of N-phenyl maleimide.

EXAMPLE 7

Approximately 300 grams of peroxidized EPDM rubber having 1120 ppm active oxygen was prepared according to Example 2. The 300 grams of peroxidized EPDM were dissolved in 625 grams of chlorobenzene in a 3 pint pressure reaction vessel at 60° C. The reactor was charged with 300 grams of a comonomer mixture comprised of 90% styrene monomer and 10% methacrylic acid (MAA) monomer. The reactor was heated to 140° C. for four hours. The polymer mass obtained was precipitated in a threefold excess of methanol using a Waring Blender. The polymer crumb obtained was dried under vacuum at 110° C. The total EPDM-g-S/MAA recovered was 580 grams (96.1% conversion). Soxhlet extraction of 26 grams of the EPDM-g-S/MAA with methyl ethyl ketone for 121 hours revealed 5.28 grams (44%) of non-grafted S/MAA with peak molecular weight of 187,000. The level of S/MAA grated to the EPDM rubber was 56%. The glass transition temperature of both the grafted and non-grafted S/MAA was 123° C. The S/MAA copolymer grafted to the EPDM contained 9.8% by weight of methacrylic acid.

EXAMPLE 8

Approximately 300 grams of peroxidized EPDM rubber having 1196 ppm active oxygen were prepared according to Example 2. The 300 grams of peroxidized EPDM were dissolved in 650 grams of chlorobenzene in a 3 pint pressure reaction vessel at 62° C. The reactor was equipped with a pressure equalizing addition funnel which was charged with 300 grams of a comonomer solution comprised of 75% styrene and 25% N-phenyl maleimide. The temperature of the resin kettle was raised to 110° C. At this point, dropwise addition of the styrene/N-phenyl maleimide solution was initiated and maintained at a rate of 15 grams/5 minutes. The temperature of the reaction was raised to 130° C. and maintained for 100 minutes at which time the polymer mass was diluted with 300 grams of chlorobenzene and precipitated into a fourfold excess of methanol in a Waring Blender. The pale yellow crumb recovered was dried under vacuum at 120° C. The total of EPDM-g-S/NPMI recovered was 530 grams (88.3% conversion). Soxhlet extraction of 50 grams of the EPDM-g-S/NPMI with methyl ethyl ketone for 115 hours revealed 10 grams (45%) of non-grafted S/NPMI copolymer with peak molecular weight of 112,000. The level of S/NPMI grafted to the EPDM rubber was 55%. The glass transition temperature of both the grafted and non-grafted S/NPMI was 150° C. The S/NPMI copolymer grafted to the EPDM was determined to contain 30% (by weight) of N-phenyl maleimide.

EXAMPLE 9

Approximately 200 grams of peroxidized EPDM rubber having 1072 ppm active oxygen were prepared according to Example 2. The 300 grams of peroxidized EPDM were dissolved in 400 grams of chlorobenzene in a 3 pint pressure reaction vessel at 62° C. The reactor was equipped with a pressure equalizing addition funnel. The reactor was charged with 150 grams of styrene.

The addition funnel was charged with a chlorobenzene/maleic anhydride solution (100 g/80 g). The temperature of the reaction vessel was raised to 132° C.; once the temperature reached 100° C. the addition of the chlorobenzene/maleic anhydride solution was commenced at a rate of 10 grams/minute. Once all the chlorobenzene/maleic anhydride solution had been added the reaction was short stopped with hydroquinone/tetrahydrofuran solution. The polymer mass was diluted with 300 grams of chlorobenzene and precipitated into a fourfold excess of methanol in a Waring Blender. The polymer crumb was dried under vacuum at 120° C. The total EPDM-g-S/MA recovered was 400 grams (93%). Soxhlet extraction of 20 grams of the EPDM-g-S/MA with methyl ethyl ketone for 122 hours revealed 4.7 grams (48%) of non-grafted S/MA copolymer with peak molecular weight of 121,000. The level of S/MA grafted to the EPDM rubber was 52.3%. The glass transition temperature of both the grafted and non-grafted S/MA was 152° C. The S/MA grafted to the EPDM rubber was determined to contain 25% maleic anhydride.

EXAMPLE 10

Approximately 350 grams of an EPDM-grafted with styrene/N-phenyl maleimide was prepared in a manner similar to Example 9 with the exception that the proportion of styrene to N-phenyl maleimide in the comonomer solution was 50:50. The proportionate increase in N-phenyl maleimide concentration resulted in a styrene/N-phenyl maleimide copolymer graft having 40 weight % N-phenyl maleimide. The level of S/NPMI grafted to EPDM was 47% as determined by MEK extraction technique. The S/NPMI graft copolymer had a peak molecular weight of 118,000 and a Tg=179° C.

EXAMPLE 11

This example demonstrates the preparation of an EPDM-graft-styrene/acrylonitrile (SAN) according to the invention.

In a 1-liter resin kettle 100 grams of Royalene ®HT 580 an ethylene-propylene-dicyclopentadiene terpolymer (EPDM) commercially available from Uniroyal Chemicals Division of Uniroyal Inc. were dissolved in 450 grams of monochlorobenzene by heating for 3.5 hours at 70° C. with stirring. After the EPDM was dissolved, 60 grams of 39.6% t-butyl hydroperoxide in toluene were added along with 5 grams of 6% cobalt napthenate and 0.42 gram cobalt (acetyl acetonate). The cobalt catalysts were added in equal portions over a 6 hour period. The EPDM rubber was precipitated into methanol and dried in vacuo at 25° C. for 48 hours.

About 50 grams of the resulting peroxidized EPDM were combined with 60 grams of absolute ethanol, 35 grams of inhibitor free styrene and 15 grams of acrylonitrile in a citrate bottle, stopped and heated to a polymerization temperature of 100° C. in a cirulating oil bath for 36 hours.

The resulting EPDM-graft-SAN was analyzed and its properties compared with an EPDM-g-SAN prepared using the prior art method of U.S. Pat. No. 3,498,822 as described in Example 12. The property comparison is shown in following Table II.

EXAMPLE 12

This example is for comparative purposes and demonstrates the preparation of a peroxidized elastomer according to the procedure of U.S. Pat. No. 3,489,822.

In a 4-liter resin kettle 125 grams of Royalene ®HT 580 EPDM were dissolved in 3-liters of cumene at 65° C. with stirring. Once dissolved, 150 ml of absolute ethanol were added along with 5 ml of cumene hydroperoxide. Air was bubbled through the solution for 4 hours at 65° C. The EPDM was precipitated into methanol and dried in vacuo at 25° C. for 48 hours.

About 50 grams of the resulting peroxidized EPDM were combined with 60 grams of absolute ethanol, 35 grams in inhibitor free styrene and 15 grams of acrylonitrile in a citrate bottle, stopped and heated to a polymerization temperature of 94° C. in a circulating oil bath for 36 hours.

The resulting EPDM-g-SAN was analyzed and its properties are shown in following Table II.

TABLE II

|  | Peroxidized Example 11 (Invention) | Elastomer of: Example 12 (Prior Art) |
|---|---|---|
| level of peroxide (ppm) | 1120 | 397 |
| yield based on monomers (%) | 98 | 80 |
| % SAN, grafted | 47.1 | 19.8 |
| Peak mol. wt. | 162,000 | 124,000 |
| % AN | 30.9 | 29.9 |

The above data serve to show that the level of grafting achieved using the method of this invention is significantly greater than that obtained from the prior art method. In this showing the level of grafting achieved using the method of the invention (47.1%) was more than twice the amount achieved by the prior art method (19.8%).

It will be evident from the foregoing that various modifications can be made to this invention. Such, however, are considered as being within the scope of the invention.

What is claimed is:

1. A method for preparing an elastomer grafted with a polymer matrix, which method comprises reacting
    (a) an elastomer having from about 0.05 to about 0.1 weight percent random dialkyl or alkyl aryl peroxide functionality obtained by the reaction of an alkyl or aryl hydroperoxide with an elastomer containing from about 1 to about 20 weight percent pendant allylic, benzylic, or conjugated unsaturation in the presence of a Group VIIa, VIII, Ib, or IIb metal catalyst, and
    (b) at least one free radical polymerizable monomer selected from the group consisting of styrene, alpha-methyl-styrene, p-methylstyrene, p-chlorostyrene, p-bromostyrene, dibromostyrene, p-cyanostyrene, methyl methacrylate, methacrylic acid, acrylic acid, methyl acrylate, n-butyl acrylate, acrylonitrile, maleic anhydride, citraconic anhydride, maleimide, N-methylmaleimide, N-ethyl maleimide, N-phenyl maleimide, N-(4-methyl)phenylmaleimide, N-(4-chloro)phenylmaleimide, N-(4-bromo)phenylmaleimide, N-(3-methyl)phenylmaleimide, N-(3-chloro)phenylmaleimide, N-(3-bromo)phenylmaleimide, N-(2-methyl)phenylmaleimide, N-(2-chloro)phenylmaleimide, N-(2-bromo)phenylmaleimide, methacrylonitrile, p-vinyl benzoic acid, and vinyl chloride,
    wherein elastomer (a) serves to initiate the polymerization of (b), and
    wherein the resulting polymer matrix of (b) is grafted onto elastomer (a) at a level of from about 40 to about 60 percent by weight.

* * * * *